United States Patent Office 2,700,307
Patented Jan. 25, 1955

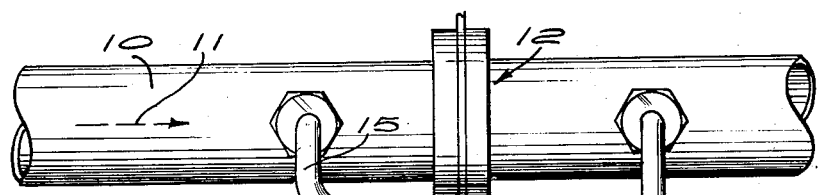
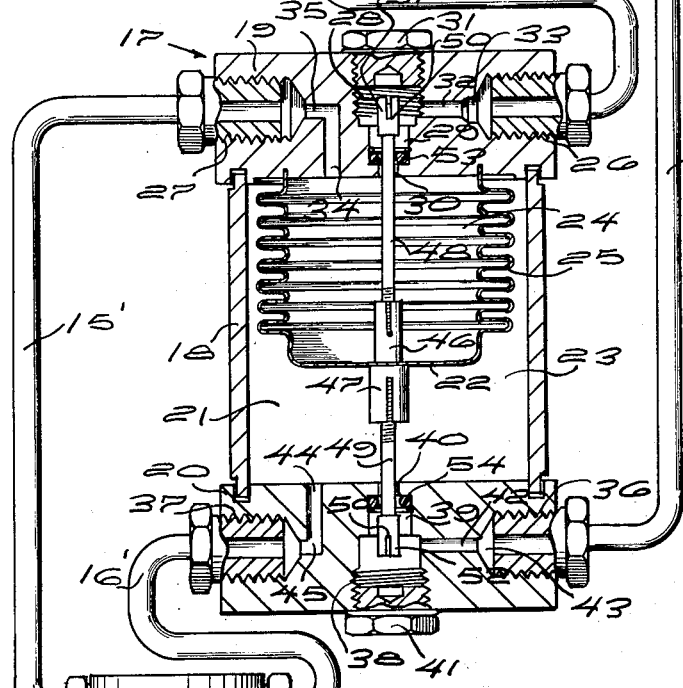
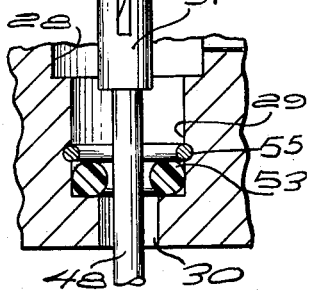
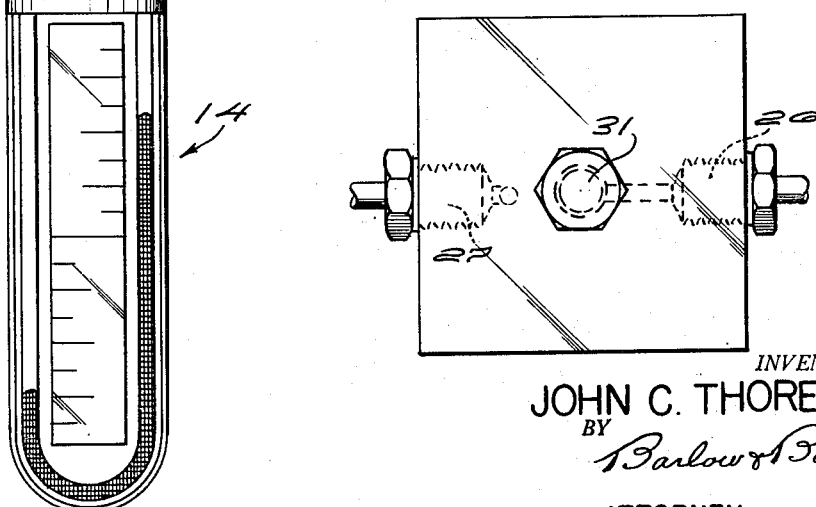

2,700,307

DEVICE FOR PROTECTING FLOW GAUGE FROM OVERLOADS

John C. Thoresen, Warwick, R. I., assignor to B-I-F Industries, Inc., a corporation of Rhode Island Application January 6, 1951, Serial No. 204,778

6 Claims. (Cl. 73—389)

This invention relates to a device for protecting a gauge, which will indicate the flow of liquid, from an overload due to sudden increase in pressure.

It is customary to position some sort of a differential producer in the flow line for liquid in order that the flow may be gauged through the line and in this connection some gauge, such as a manometer or other differential indicator, is connected to opposite sides of the differential pressure producer. At different times an overload, such as a sudden surge of pressure or a sudden surge of back pressure, may occur which overloads the gauge to such an extent that damage occurs to it.

One of the objects of this invention is to insert in the leads to the gauge a unit which is entirely separate from the gauge but which will protect the gauge from sudden overloads such as either increased pressure on either side of the gauge.

Another object of this invention is to provide a device which may be connected across the leads from either side of the differential producer and which is of a structure useable on the manometer type of indicator.

Another object of this invention is to provide a simple yet effective device for protecting a differential indicator or gauge and which may be readily adjusted for different amounts of movement before its control operation comes into effect.

Another object of this invention is to provide a device which will work in two directions, that is, for increase of pressure on one side of the line or for increase back pressure on the other side of the line and to provide a limit in both directions.

With these and other objects in view, the invention consists of certain novel features of construction, as will be more fully described and particularly pointed out in the appended claims.

In the accompanying drawings:

Figure 1 is a central sectional view through the device and illustrating schematically the position of the device between a flow line and the indicator which functions to show the flow;

Figure 2 is a fragmental section on a larger scale of the control mechanism of Figure 1;

Figure 3 is a top plan view of the device shown in section in Figure 1.

In proceeding with this invention I provide some sort of a movable separator in a chamber to divide the same into the compartments one of which may be increased at the expense of the other which becomes correspondingly decreased. The separator is caused to move in one direction or the other direction depending upon the pressures which are present on either side of it and which will move an additional amount due to any sudden change of the relative pressures which are existent on either side of the separator. The device is connected across the lines leading from the high pressure side to the differential indicator and from the differential indicator to the low pressure side of the line being gauged. To the movable separator there is connected a stem extending in opposite directions which is provided with an enlarged portion to close communication between inlet and outlet ports on one side or the other side of the separator depending upon the direction of movement of the separator.

With reference to the drawings, 10 designates a conduit in which liquid is flowing in the direction shown by the arrow 11 and in which there is an orifice or other pressure differential producing device designated 12. A manometer or other differential indicator is designated generally 14 and has a lead from the high pressure side to the manometer as at 15, 15' and a lead from the manometer back to the low pressure side as at 16, 16'. The unit which is the subject of this invention is connected across these lines and is designated generally 17.

This unit comprises a casing having a hollow body portion 18 with heads 19 and 20 at either end thereof forming a chamber 21 within this casing. A separator 22 which in this case is shown as a bellows is located within the chamber 21 and divides the chamber into a compartment 23 and another compartment 24. This separator end wall 22 is provided with an expandable portion 25 which will permit the end wall 22 to move toward the head 19 or toward the head 20, depending upon the relative pressures in the compartments 23 and 24.

The upper head 19 has an inlet port 26 with bores connecting this port to the compartment 24 and an outlet port 27 with bores also connecting this port to the compartment 24. As shown in the drawings, there is a vertical threaded bore 28 having a reduced portion 29 and a further reduced portion 30, the threaded portion being closed by a removable plug 31. Joining this portion 28, there are also bores 32 and 33 which connect the port 26 with the bores 28, 29, and 30, thus providing a conduit from the inlet port 26 to the compartment 24. A pair of bores 34 and 35 connect the compartment 24 with the outlet port 27. In the lower head 20 there is an inlet port 36 and an outlet port 37 to the compartment 23. A threaded bore 38 in axial alignment with the threaded bore 28 is connected with a reduced bore 39 and a further reduced bore 40, the threaded bore being closed by a plug 41. Bores 42 and 43 connect the inlet port 36 with the compartment 23 through the bores 38, 39, and 40. A pair of bores 44 and 45 serve to connect the compartment 23 with the outlet port 37 in all ways similar to the arrangement in the head 19.

The separator 22 has fixed to it end wall blocks 46 and 47 into each of which there is threadingly secured parts of a stem, the upper part being designated 48 and the lower stem part being designated 49. These stem parts are slotted at their ends as at 50 and access may be had to each of them by removal of the plugs 31 or 41 so that they may be adjusted by a screwdriver to the desired position. Each of these stem parts 48 and 49 are provided with enlarged portions 51 and 52. O rings 53 and 54 seat upon the shoulders between the bores 29, 30 and 39 and 40 and are of such a size relative to the diameter of the stem as to permit free flow of liquid between the stem and the O ring while the heads 51 and 52 are of such diameter that when the stem is moved an amount to cause the enlarged portion 51 and 52 to enter the O ring, a liquid seal is provided. The O ring is held in place by a spring ring 55.

Connection 15 is had from the high pressure side of the differential pressure producer 12 to the port 26 and connection 15' from the outlet port 27 to the indicator 14, while the indicator is connected to the outlet port 37 and the low pressure side of the device 12 is connected to the inlet port 36 by conduit 16 by connector 16'.

In operation, as long as the pressures are normal, the parts will maintain the position substantially as shown in section in Figure 1. Pressure from opposite sides of the differential producer is freely transmitted to the indicator 14. Should, however, the pressure on the high pressure side of the differential producer 12 suddenly increase, the separator 22 would move to draw the enlarged portion 51 of the stem 48 into the O ring 53 and there cause a seal to be provided and a limit to the amount of pressure that could further act to affect the manometer or other indicator, thus limiting the amount of pressure that could be transmitted to the manometer and preventing any overload on the manometer. On the other hand, should the pressure on the low pressure side suddenly increase, the stem portion 49 would be moved to draw the enlarged portion 52 into the O ring 54 and block an overload surge in the opposite direction from reaching the manometer or differential indicator, thus protecting it from overload in this direction.

In each installation the stem portions would be adjusted to the desired part of the movement which would be necessary for protection to be had.

I have referred to the bellows above indicated as a separator, as it will be readily apparent that any wall which separates the chamber 21 into compartments 23 and 24 may be utilized as long as this will move so as to transmit a change of relative pressures in an amount sufficient to move the stems a required distance. Pistons or diaphragms are other common forms of equivalents for the bellows in this connection.

I claim:

1. In combination, a pressure responsive apparatus, an overload protective device comprising a casing providing a chamber within, a movable separator dividing the chamber into two parts, said casing having a set of inlet and outlet ports to each part of the chamber on opposite sides of the separator, said separator being movable in response to difference in the pressures in said chamber parts, a conduit connected to one inlet port, a conduit connected from the pressure responsive apparatus to the outlet port on the same side of the separator as said inlet port, and a member movable in response to movement of said separator arranged to close the first said conduit to said separator upon a predetermined movement of the separator.

2. In combination, a pressure responsive apparatus, an overload protective device comprising a casing providing a chamber within, a movable separator dividing the chamber into two parts, said casing having a set of inlet and outlet ports to each part of the chamber on opposite sides of the separator, said separator being movable in response to difference in the pressures in said chamber parts, a conduit connected to each inlet port, conduits connected from the pressure responsive apparatus one to each of said outlet ports, and a member movable in response to movement of said separator arranged to close one of said inlet conduits upon a predetermined movement of the separator in one direction and arranged to close the other inlet conduit upon a predetermined movement of the separator in the other direction.

3. An overload protective device as in claim 1 wherein the member is a stem attached to said movable separator.

4. An overload protective device as in claim 1 wherein the member is a stem attached to said movable separator and provided with an enlarged portion to engage a seal.

5. An overload protective device as in claim 1 wherein the member is a stem attached to said movable separator and provided with an enlarged portion to enter an O ring seal and provide a resilient seal.

6. An overload protective device as in claim 1 wherein the member is a stem attached to said movable separator and provided with an enlarged portion to engage a seal and means to adjust the enlarged portion relative to the separator.

References Cited in the file of this patent

UNITED STATES PATENTS

| | | |
|---|---|---|
| 1,239,565 | Collinson | Sept. 11, 1917 |
| 2,058,858 | Fetyko | Oct. 27, 1936 |
| 2,252,923 | Granetz | Aug. 19, 1941 |
| 2,524,142 | Seeloff | Oct. 3, 1950 |
| 2,558,534 | Bentley | June 26, 1951 |

FOREIGN PATENTS

| | | |
|---|---|---|
| 396,819 | Germany | June 11, 1924 |